United States Patent

Park et al.

[11] Patent Number: 5,359,180
[45] Date of Patent: Oct. 25, 1994

[54] POWER SUPPLY SYSTEM FOR ARCJET THRUSTERS

[75] Inventors: John N. Park, Rexford; Robert L. Steigerwald, Burnt Hills, both of N.Y.; George D. Goodman, Phoenixville, Pa.; David B. Stewart, Cranbury, N.J.

[73] Assignee: General Electric Company, East Windsor, N.J.

[21] Appl. No.: 956,131

[22] Filed: Oct. 2, 1992

[51] Int. Cl.⁵ .................... B23K 9/06; B23K 9/073
[52] U.S. Cl. .................... 219/121.54; 219/121.57; 219/121.52; 60/203.1; 307/71; 307/85
[58] Field of Search ............... 219/121.34, 121.57, 219/121.55, 486, 121.52; 307/69, 71, 85, 39–41; 60/203.1

[56] References Cited

U.S. PATENT DOCUMENTS

| | | | |
|---|---|---|---|
| 4,644,140 | 2/1987 | Kenny et al. | 307/75 |
| 4,717,833 | 1/1988 | Small | 307/44 |
| 4,729,086 | 3/1988 | Lethellier | 363/65 |
| 4,766,724 | 8/1988 | Gruber | 60/203.1 |
| 4,788,449 | 11/1988 | Katz | 307/43 |

*Primary Examiner*—Mark H. Paschall
*Attorney, Agent, or Firm*—W. H. Meise; C. A. Berard; S. A. Young

[57] ABSTRACT

A power supply system for thrusters (e.g., arcjet thrusters) in a spacecraft system comprises lightweight, redundant power supplies that share the power distribution function to the thrusters. Each power supply comprises a plurality of parallel-connected power supply subunits of which the combined power output capability exceeds the required maximum power demand by at least one subunit capacity for each arcjet thruster in the system. Each power supply subunit comprises a lightweight, high-frequency, soft-switching power supply. For arcjet systems comprising arcjet thrusters that do not operate simultaneously, relays are employed to switch between thrusters.

5 Claims, 4 Drawing Sheets

POWER SUPPLY SYSTEM FOR ARCJET THRUSTERS

RELATED APPLICATIONS

This application is related to U.S. patent application Ser. No. 07/956,130, filed Oct. 2, 1992 in the name of R. L. Steigerwald and J. N. Park, and to U.S. patent application Ser. No. 07/955,970, filed Oct. 2, 1992 in the name of R. L. Steigerwald and J. N. Park, both filed concurrently herewith and incorporated by reference herein.

FIELD OF THE INVENTION

The present invention relates generally to thrusters for space applications, such as, for example, arcjet thrusters in a satellite system, and, more particularly, to a power supply system therefor which is lightweight and provides redundancy for fault tolerance.

BACKGROUND OF THE INVENTION

A typical satellite employs four arcjet thrusters. Each arcjet thruster requires a power supply; and a typical power supply for an arcjet thruster employs a pulse width modulated (PWM) converter operating in a current-controlled mode. Disadvantageously, operation of such converters involves hard, i.e., lossy, switching, such that operating frequencies are relatively low (e.g., 20 kHz); hence, relatively large and heavy magnetic and capacitive components are needed. Moreover, with a single power supply being required for each thruster, there is no power supply redundancy so that fault tolerance is minimal.

Accordingly, it is desirable to provide a power supply system for arcjet thrusters in a satellite system or other spacecraft which is lightweight while providing redundancy.

SUMMARY OF THE INVENTION

A power supply system for thrusters (e.g., arcjet thrusters) in a spacecraft system comprises lightweight, redundant power supplies that share the power distribution function to the thrusters. Each power supply comprises a plurality of parallel-connected power supply subunits of which the combined power output capability exceeds the required maximum power demand by at least one subunit capacity for each arcjet thruster in the system. Each power supply subunit comprises a lightweight, high-frequency, soft-switching power supply. For arcjet systems comprising arcjet thrusters that do not operate simultaneously, such as in a satellite system, relays are employed to switch between thrusters.

In a preferred arcjet power supply system, e.g., for a satellite, wherein four arcjet thrusters are employed, only two being fired at any particular time, two power supplies according to the present invention are used, each comprising a plurality of power supply subunits. Each power supply is coupled to one pair of the arcjet thrusters via a single-pole, double-throw relay. Preferably, for a minimum relay contact rating, logic means allows arcjet thruster selection via the relays during time intervals in which the thrusters are not operating. Each power supply subunit is coupled by diode-OR means to the output bus of the respective power supply such that, in the event of failure of any subunit, the failed subunit is effectively isolated from the output bus.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
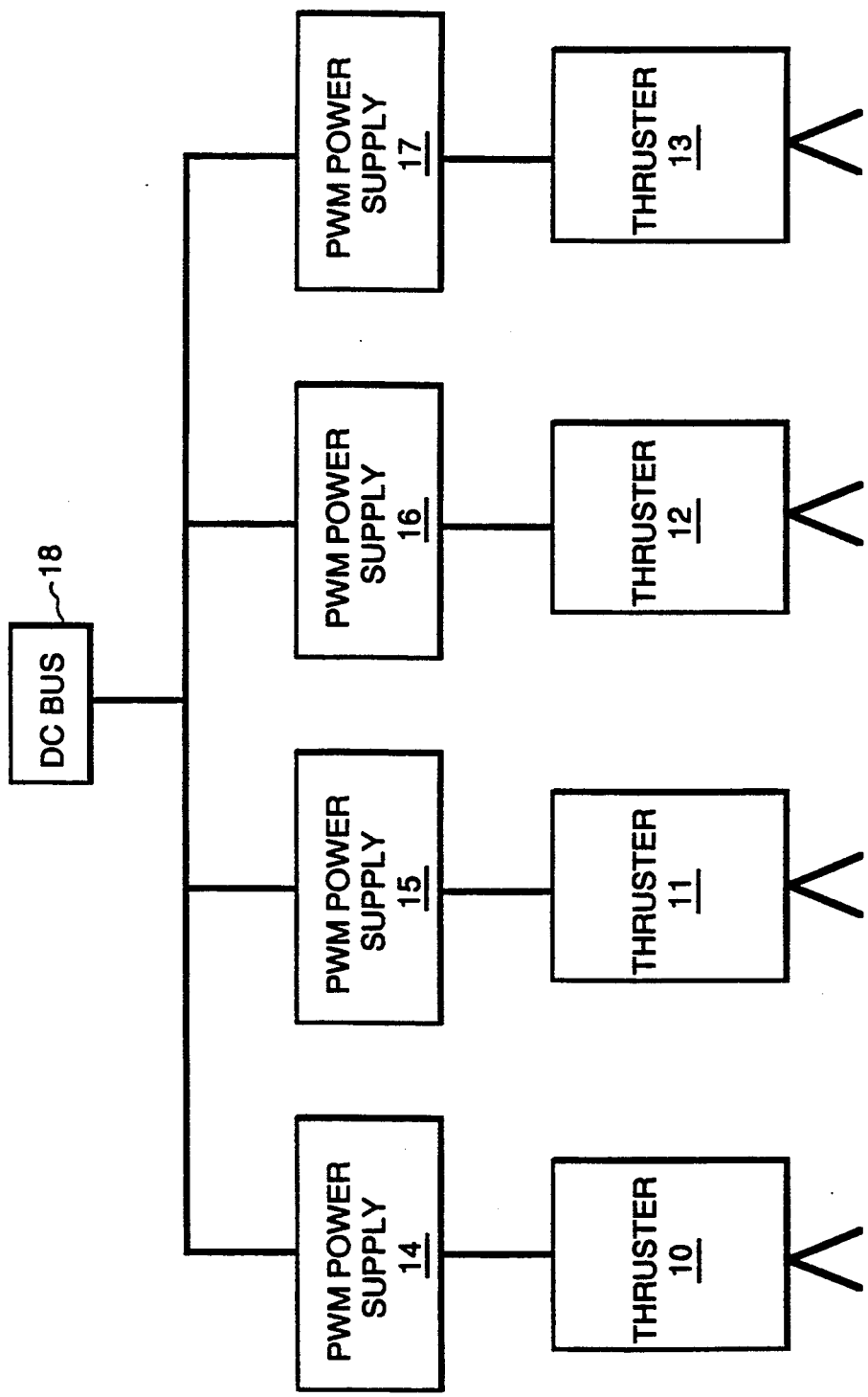
FIG. 1 is a block diagram illustrating a typical arcjet thruster system such as of a type employed in a satellite system.

FIG. 1 illustrates a typical arcjet thruster power system. By way of example, the arcjet thruster system of FIG. 1 is shown as comprising four arcjet thrusters 10–13, such as, for example, are employed in a typical satellite system. As shown, each arcjet thruster 10–13 has its own pulse width modulated (PWM)power supply, 14–17, respectively, each of which is coupled to a dc bus 18 for receiving an input dc voltage. Exemplary PWM power supplies for arcjet thrusters are described in Gruber U.S. Pat. No. 4,766,724, issued Aug. 30, 1988 and incorporated by reference herein.

Disadvantageously, power supplies 10–13 include PWM converters operating with hard, i.e., lossy, switching, such that operating frequencies are relatively low (e.g., 20 kHz); hence, relatively large and heavy magnetic and capacitive components are needed. Moreover, with a single power supply being required for each thruster, there is no power supply redundancy so that fault tolerance is minimal.

Figure 2:
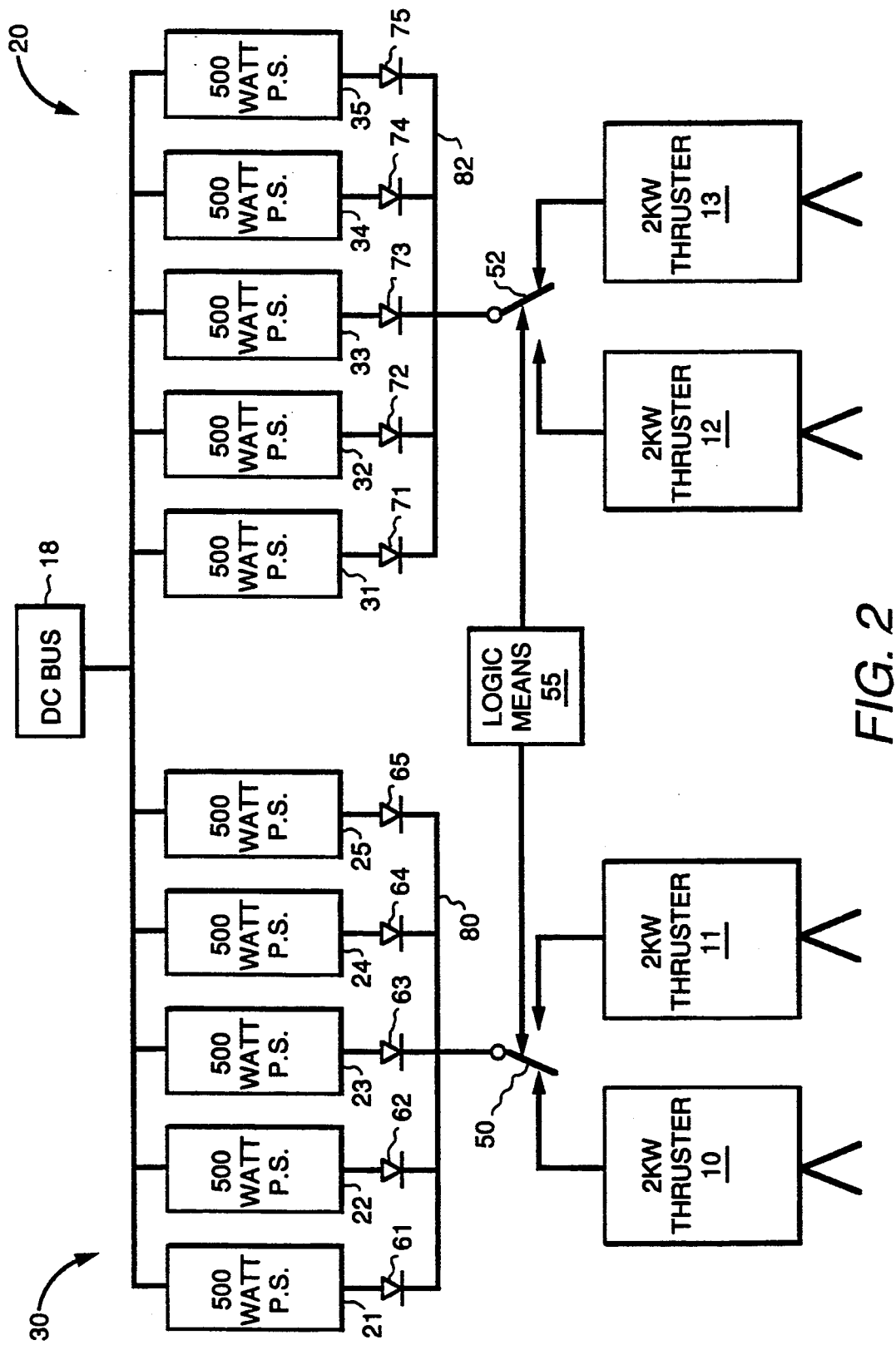
FIG. 2 is a block diagram illustrating an arcjet thruster power system according to a preferred embodiment of the present invention.

FIG. 2 illustrates an arcjet power system according to the present invention comprising two power supplies 20 and 30, each comprising a plurality of parallel-connected power supply subunits, 21–25 and 31–35, respectively. Only two power supplies are employed because, in a typical satellite system, only two thrusters fire at any one time. The combined power output capability of the parallel-connected power supply subunits exceeds the maximum power demand of each arcjet thruster by at least the power capacity of one subunit. For example, for the 2 kW thrusters shown in FIG. 2, each power supply 20 and 30, respectively, has five 500 W subunits 21–25 and 31–35, respectively, providing a redundancy of one power supply subunit for each power supply.

Power supplies 20 and 30 preferably comprise soft-switching converters such as of a type described in commonly assigned U.S. patent application Ser. No. 07/956,130 (docket no. RD-22,134) of R. L. Steigerwald and J. N. Park, cited hereinabove. An arcjet power supply according to U.S. patent application Ser. No. 07/956,130 (docket no. RD-22,134) comprises a resonant converter having a resonant tank circuit with an inherently adjustable load quality (Q) factor which accommodates changes in arc voltage from initiation to steady-state operation. In particular, a higher voltage at a lower current is needed to initiate the arc; and, during steady-state operation, a lower voltage at a higher current is needed to maintain a stable arc. Effectively, the resonant tank circuit acts as a ballast by matching the arc during initiation thereof through steady-state operation. This ballasting characteristic also allows the power supply subunits to be easily paralleled.

Figure 3:
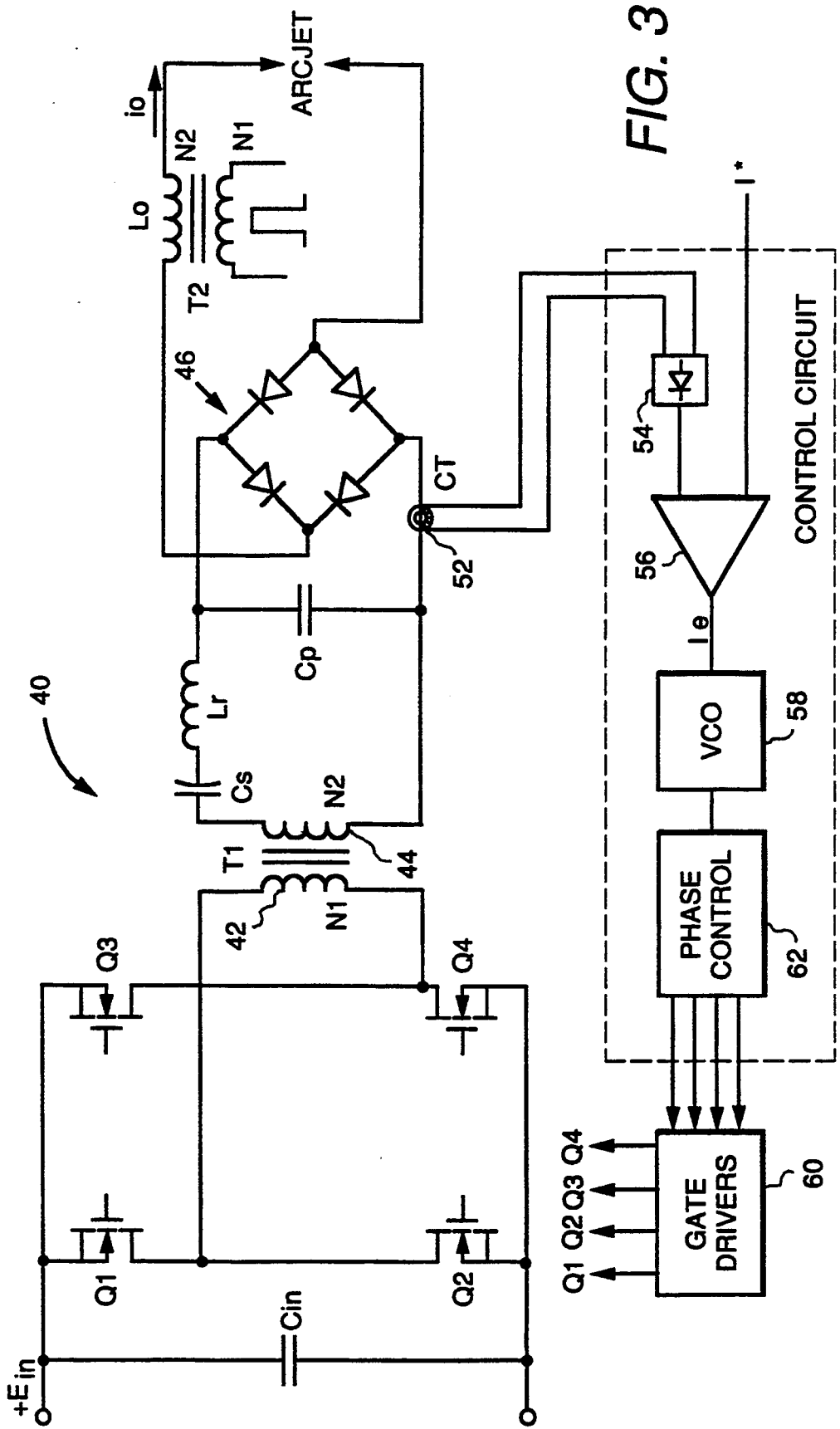
FIG. 3 schematically illustrates a soft-switching resonant converter useful in the power system of the present invention.

As shown in FIG. 3, one embodiment of an arcjet power supply according to U.S. patent application Ser. No. 07/956,130 (docket no. RD-22,134) includes a series/parallel resonant converter 40 employing four switching devices Q1–Q4 coupled in a full-bridge configuration across an input dc voltage Ein and a resonant tank circuit. The resonant tank circuit comprises: a resonant inductor Lr, a series resonant capacitor Cs, and a parallel resonant capacitor Cp. A transformer T1 provides isolation and impedance transformation between converter 40 and the arcjet load. Transformer T1 has a primary winding 42 (with a number of turns N1) coupled between the junctions joining the switching devices of each phase leg of the full-bridge; and a secondary winding 44 (with N2 turns) coupled across the resonant tank circuit. The resonant load circuit is coupled across parallel resonant capacitor Cp and comprises a combination of a diode rectifier 46, a filter inductor Lo for smoothing the current supplied to the arc, and the arcjet load.

In operation, a control circuit 50 is shown as including both frequency control means and phase shift control means. Frequency is adjusted in order to control the load current in response to the current command I*. In particular, the load current is measured by a current sensor 52 and rectified by a rectifier 54, resulting in a signal representative of the dc current in inductor Lo and the arc. The current signal from rectifier 54 is compared in an error amplifier 56 to the current command I* and the resulting current error signal Ie is provided to a voltage-controlled oscillator (VCO) 58 for adjusting the operating frequency of the resonant converter, via gate drive circuitry 60. Preferably, the resonant converter is operated slightly above the resonant frequency of the tank circuit in order to maintain soft, i.e., nearly lossless, switching, and the frequency is varied to control the output current in accordance with a current command I*. Additionally, a phase control 62 receives the output signal from VCO 58 and phase shifts the two phase legs of the bridge converter, via drive circuitry 60, in order to control the fundamental component of voltage driving the resonant tank circuit.

Advantageously, a soft-switching power supply such as that of U.S. patent application Ser. No. 07/956,130 (docket no. RD-22,134) efficiently operates at high frequencies so that magnetic and capacitive components may be made smaller and lighter. Moreover, by using only two power supplies 20 and 30 to drive four arcjet thrusters, power supply system weight is further minimized.

Referring back to FIG. 2, relays 50 and 52 are provided to couple a pair of thrusters 10–11 and 12–13, respectively, to one of power supplies 20 and 30, respectively. Relays 50 and 52 each comprise a single-pole, double-throw switch. Logic means 55 prevents relay contact opening or closing during a corresponding thruster operating cycle, according to a method well-known in the art, such that relays having a minimum contact rating, and hence a minimum weight, can be employed.

As shown in FIG. 2, each power supply subunit 21–25 is connected by diode-OR means 61–65 to the output bus 80 of power supply 20. Likewise, each power supply subunit 31–35 is connected by diode-OR means 71–75 to the output bus 82 of power supply 30. In this way, any failed subunit is effectively isolated from the output bus of the respective power supply. Alternatively, the output rectifier (not shown) of each respective power supply subunit may perform this OR function without the use of additional diodes 61–65 and 71–75.

Figure 4:
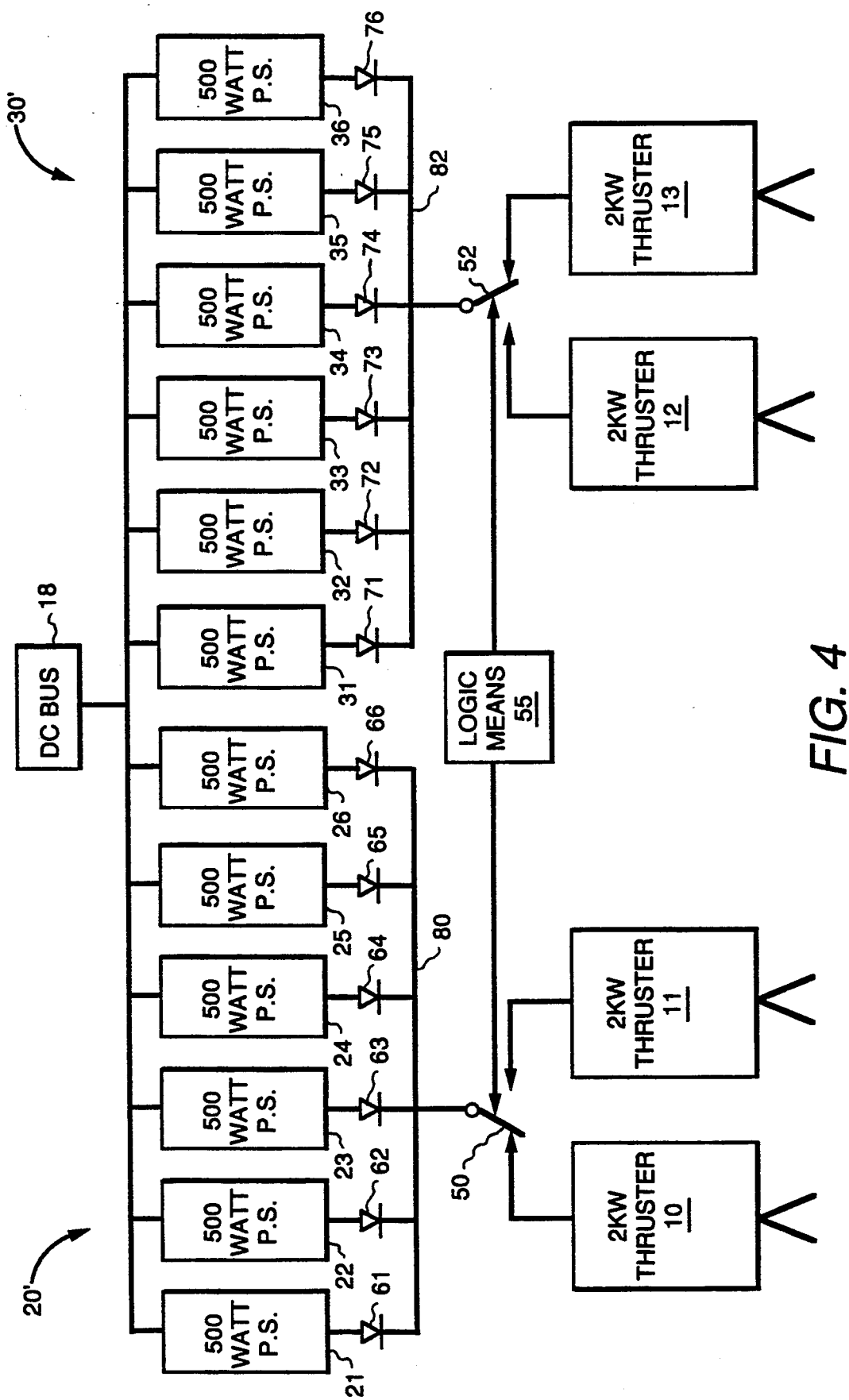
FIG. 4 is a block diagram illustrating an arcjet thruster power system according to an alternative embodiment of the present invention.

FIG. 4 illustrates an alternative embodiment of an arcjet thruster power system according to the present invention having enhanced redundancy. In particular, power supplies 20' and 30' each comprise an additional subunit 26 and 36, respectively, such that each power supply has a redundancy of two units, and the power system has a total redundancy of four subunits. A disadvantage of adding subunits is the additional weight thereof. Hence, there is a trade-off between redundancy and weight as additional subunits are employed.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An arcjet/power supply arrangement, comprising:
   a source of direct voltage;
   an arcjet including an electrical input port requiring a known power;
   a plurality of power converters coupled to said source of direct voltage for being energized thereby, each of said power converters including an output port at which a smoothed direct current is produced at a predetermined power less than said known power, each of said power converters also including (a) bridge switching means for converting said direct voltage to an alternating voltage, (b) transformer means including a primary winding coupled to said switching means and also including a secondary winding, for transforming said alternating voltage for providing isolation and impedance transformation between said source of direct voltage and said output port, (c) a resonant circuit coupled to at least one of said primary and secondary windings for creating a sinusoidal alternating current from said alternating voltage, (d) rectifying means coupled for receiving said alternating current, for rectifying said alternating current for producing direct current, and (e) inductance means coupled to said rectifying means for smoothing said direct current to produce said smoothed directed current at said output port, said plurality of power converters being greater, by an integer number, than the quotient of said known power divided by said predetermined power; and
   paralleling and coupling means coupled to said output port of each of said power converters and to said electrical input port of said arcjet, for combining said smoothed direct currents from said plurality of power converters for application to said electrical input port of said arcjet.

2. An arrangement according to claim 1, wherein said paralleling means comprises unidirectional conducting means coupled to said output port of each of said power converters, for generating an OR gate.

3. An arrangement according to claim 2, wherein said unidirectional coupling means comprises a diode coupled in series with the output port of each of said power converters.

4. An arrangement according to claim 1, further comprising:
- a second arcjet, also including an input port requiring said known power;
- control means coupled to said first-mentioned and second arcjets for control thereof in a manner proscribing simultaneous operation; and wherein
- said paralleling means is further coupled to said input port of said second arcjet, and includes single pole double throw switching means including a common throw coupled in common to said output ports of said plurality of power converters, and first and second poles coupled to said electrical input ports of said first-mentioned and second arcjets, respectively, for coupling said smoothed direct current to an selected one of said first-mentioned and second arcjets.

5. An arrangement according to claim 1, wherein said integer number is one.

* * * * *